US008296080B2

(12) United States Patent
Mancosu et al.

(10) Patent No.: US 8,296,080 B2
(45) Date of Patent: Oct. 23, 2012

(54) METHOD FOR DETERMINING AT LEAST ONE PARAMETER REPRESENTATIVE OF AT LEAST ONE INTERACTION ALONG A LONGITUDINAL DIRECTION BETWEEN A TYRE FOR VEHICLE AND THE GROUND

(75) Inventors: Federico Mancosu, Milan (IT);
Massimo Brusarosco, Milan (IT);
Stefano Melzi, Milan (IT); Federico Cheli, Milan (IT)

(73) Assignees: Pirelli Tyre S.p.A., Milan (IT);
Politecnico di Milano, Milan (IT)

( * ) Notice: Subject to any disclaimer, the term of this patent is extended or adjusted under 35 U.S.C. 154(b) by 462 days.

(21) Appl. No.: 12/312,853

(22) PCT Filed: Nov. 29, 2006

(86) PCT No.: PCT/IB2006/003400
§ 371 (c)(1),
(2), (4) Date: Feb. 12, 2010

(87) PCT Pub. No.: WO2008/065465
PCT Pub. Date: Jun. 5, 2008

(65) Prior Publication Data
US 2010/0131208 A1 May 27, 2010

(51) Int. Cl.
*G06F 19/00* (2006.01)
*G06F 7/00* (2006.01)
*G01M 17/02* (2006.01)

(52) U.S. Cl. ................... 702/33; 73/146; 701/1

(58) Field of Classification Search ............ 702/33, 702/34; 73/105, 146; 701/1, 53
See application file for complete search history.

(56) References Cited

U.S. PATENT DOCUMENTS

| 5,913,240 | A | 6/1999 | Drähne et al. |
| 6,550,320 | B1 | 4/2003 | Giustino |
| 6,904,351 | B1 | 6/2005 | Hac |
| 7,756,670 | B2 * | 7/2010 | Mancosu et al. ............ 702/151 |
| 2002/0166373 | A1 | 11/2002 | Mancosu et al. |
| 2009/0234591 | A1 * | 9/2009 | Savaresi et al. ............ 702/41 |

FOREIGN PATENT DOCUMENTS

| EP | 0 887 211 A1 | 12/1998 |
| EP | 1 757 464 A1 | 2/2007 |
| WO | WO 2005/118317 A1 | 12/2005 |

* cited by examiner

*Primary Examiner* — Bryan Bui
(74) *Attorney, Agent, or Firm* — Finnegan, Henderson, Farabow, Garrett & Dunner, L.L.P.

(57) ABSTRACT

A method of determining at least one parameter representative of at least one interaction along a longitudinal direction between a tyre and the ground, includes identifying a first parameter representative of a radial deformation of the tyre; determining a first and a second value of the first parameter in respective neighbourhoods of a first and a second longitudinal end of a footprint area defined between the tyre and ground; calculating a linear combination of the values thereby obtaining a second parameter; determining a third parameter representative of an angular velocity of the tyre; calculating a ratio between the second and third parameters; and calculating a main parameter, starting from the ratio, according to an algorithm, which main parameter is representative of a longitudinal interaction between the tyre and the ground.

52 Claims, 8 Drawing Sheets

FIG 6
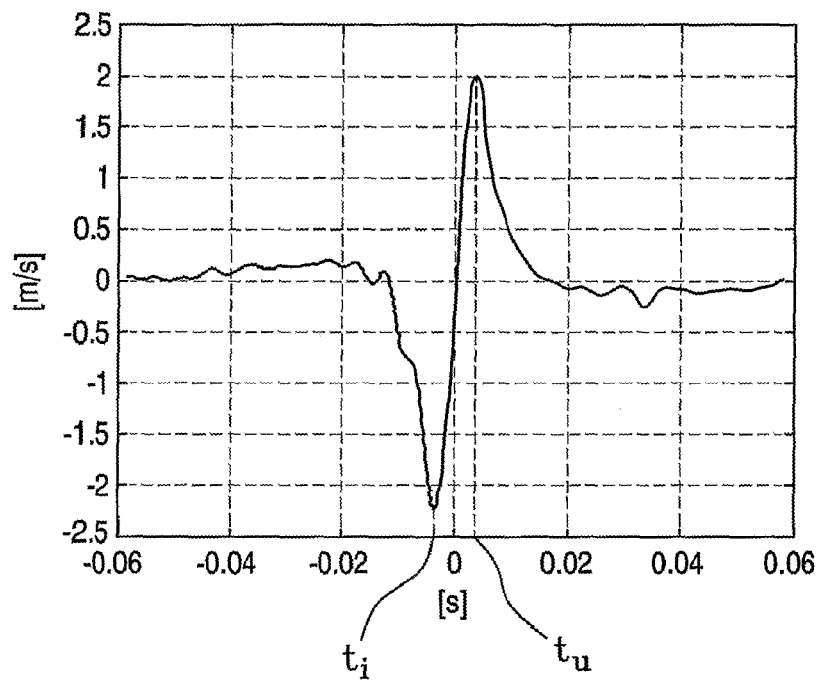
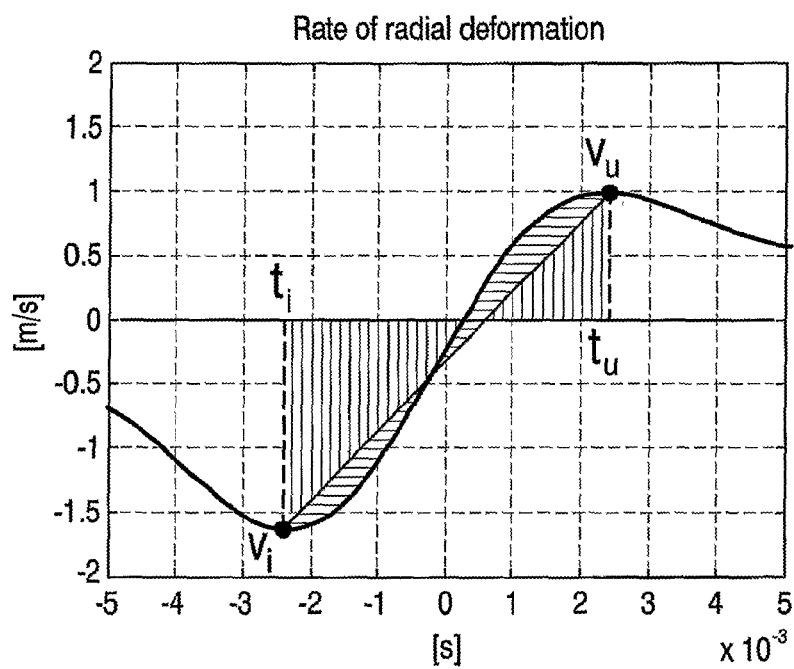
FIG 7

FIG 8
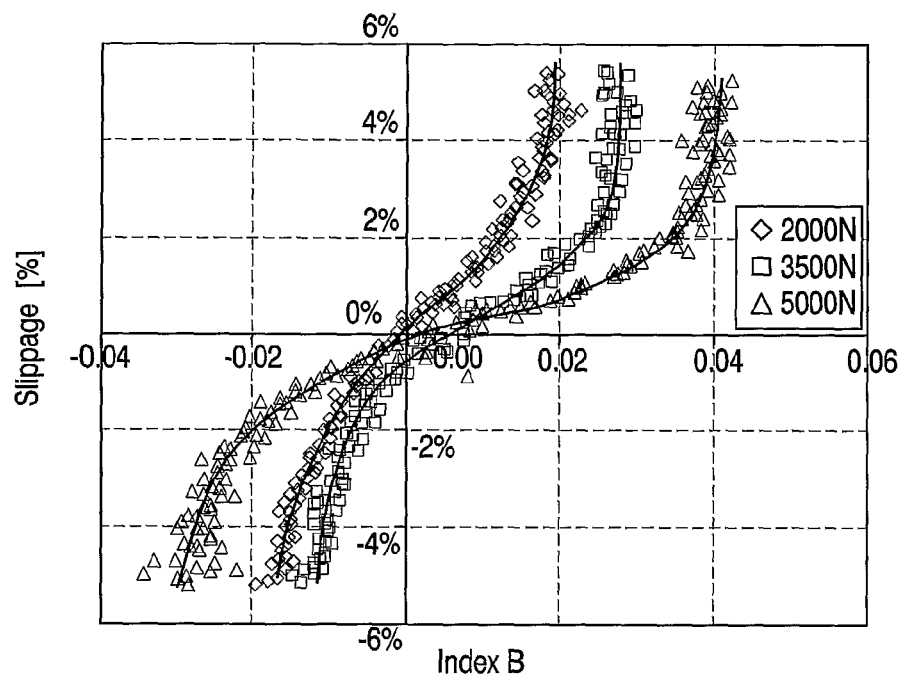
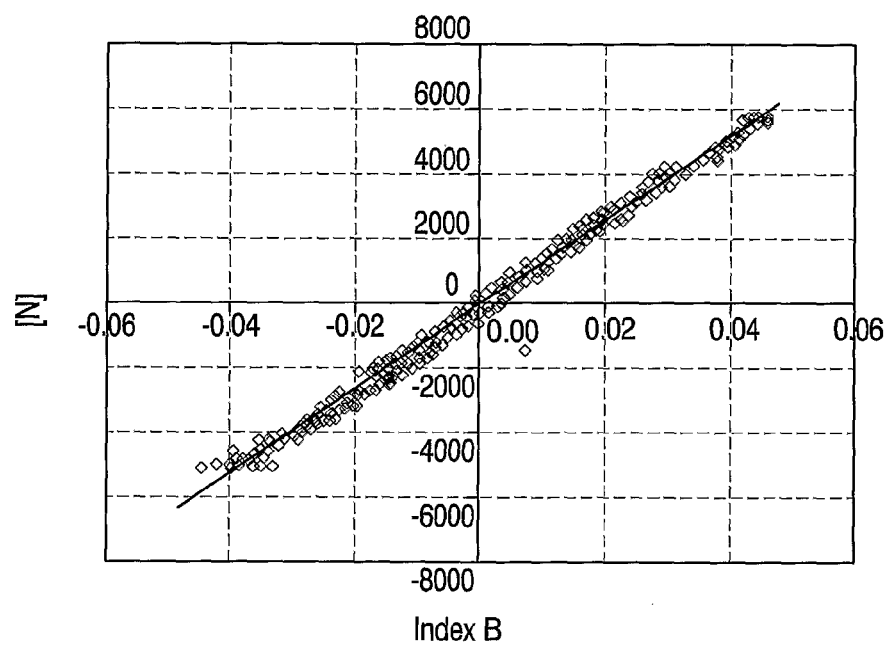
FIG 9

FIG 10
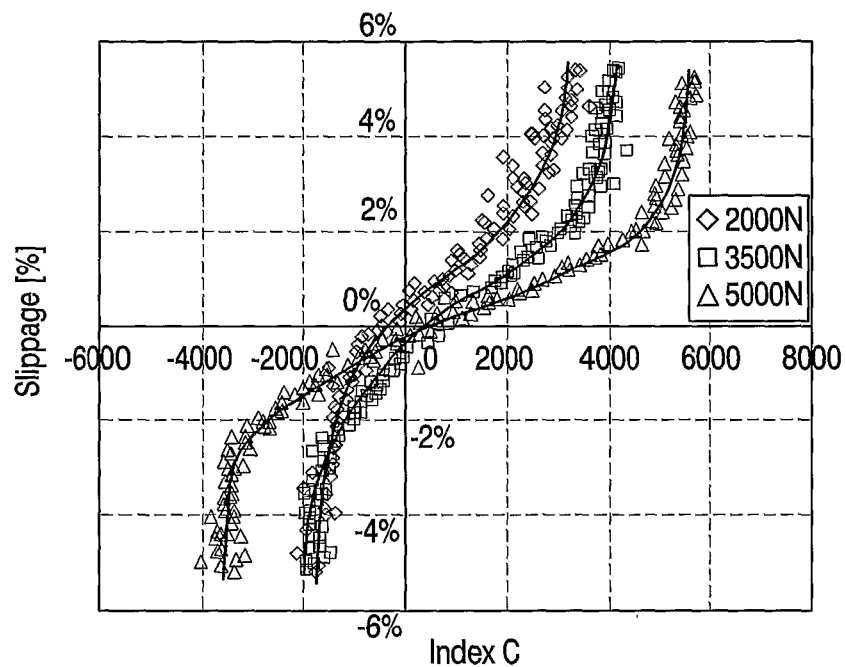
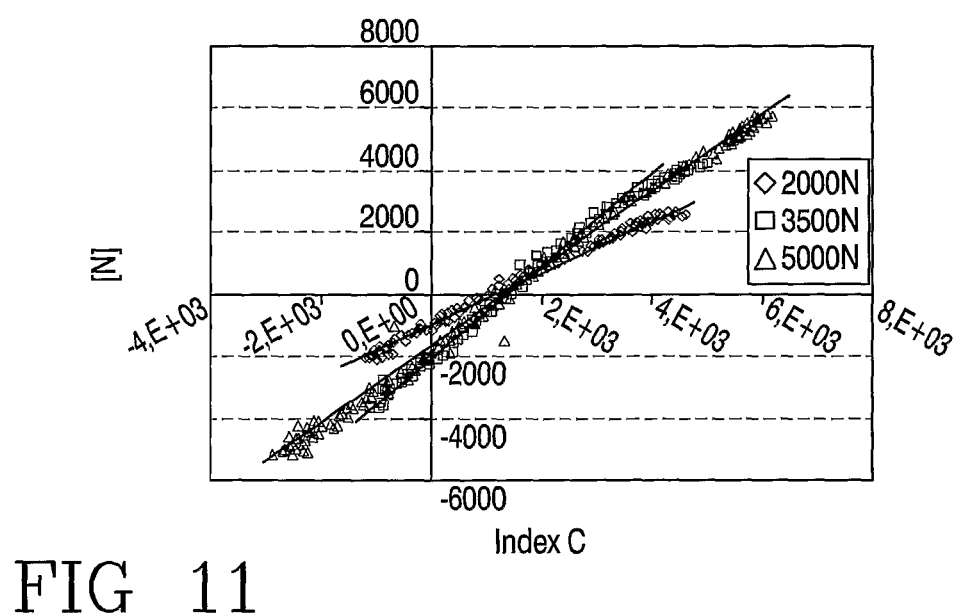
FIG 11

METHOD FOR DETERMINING AT LEAST ONE PARAMETER REPRESENTATIVE OF AT LEAST ONE INTERACTION ALONG A LONGITUDINAL DIRECTION BETWEEN A TYRE FOR VEHICLE AND THE GROUND

CROSS REFERENCE TO RELATED APPLICATION

This application is a national phase application based on PCT/IB2006/003400, filed Nov. 29, 2006, the content of which is incorporated herein by reference.

BACKGROUND OF THE INVENTION

1. Field of the Invention

The present invention relates to a method of determining at least one parameter representative of at least one interaction along a longitudinal direction between a vehicle tyre and the ground.

In particular, the invention concerns determining of a parameter representative of the longitudinal force to which the tyre is submitted in the footprint area and/or of the tyre slippage in a longitudinal direction.

The invention also relates to an apparatus for determining said parameter.

2. Description of the Related Art

In the present context, the contact region between the tyre and ground will be referred to as "footprint area".

Presently there is a need for determining the interactions generated between the tyre and ground during running of the tyre itself, in particular at the footprint area.

In fact, evaluation of these interactions is critical for a reliable determination of possible danger situations when the ground conditions are not optimal or the vehicle's speed is too high as compared with the vehicle's travel conditions.

As above said, the interactions that are herein taken into account are those generated in a longitudinal direction, i.e. the direction along which the vehicle to which the tyre is mounted runs.

Determining said interactions enables an indirect evaluation of the friction generated between the tyre and ground, thus allowing the electronic system mounted on the vehicle to automatically act on the vehicle movements, above all in case of sudden accelerating or braking actions, which conditions are generally riskier for the driver who will lose the vehicle's control.

The U.S. Pat. No. 5,913,240 discloses a system for determining the longitudinal forces generated between the tyre and ground, which system comprises at least one pair of markers mounted on the tyre to different radial distances from the hub, and at least one pair of detectors fixedly mounted on the vehicle chassis so as to detect passage of the markers at each revolution of the wheel.

Depending on the phase displacement between the two detection operations, which phase displacement is representative of the deformation to which the tyre has been submitted following braking or acceleration for example, the longitudinal force generated in the footprint area is calculated.

The U.S. Pat. No. 6,550,320 discloses a system for determining the forces generated at the footprint area by exploiting the detection of a SWT (Side Wall Torsion) sensor of the magnetic type and the processing operations carried out through a neural network or bilinear equations. In particular, the following forces acting on the tyre can be calculated: side force, circumferential torque, longitudinal force and vertical force.

The U.S. Pat. No. 6,904,351 discloses a control system for vehicles in which the longitudinal force exerted on the tyre is calculated as a function of the driving torque applied to the wheel, the braking torque applied to the wheel, the vertical force, the moment of inertia of the wheel, the rotation speed of the wheel and the radius of the wheel itself.

The Applicant has found that the systems of known type such as those briefly described above, have a significant complexity and therefore require hardware-software resources of high quality to obtain reliable measurements.

In particular, the Applicant has observed that a system of the type described in U.S. Pat. No. 5,913,240 draws the evaluation of the longitudinal force from detection of the position of two points that are radially very close to each other, i.e. the position of the two markers located on the tyre sidewall; said detection must be therefore very accurate, to ensure reliability of the subsequent calculation of the forces.

The Applicant has also noticed that for systems of the type described in U.S. Pat. No. 6,550,320 and U.S. Pat. No. 6,904,351, a high calculation capacity through which the longitudinal force is calculated, is required, due to the high number of variables on which the intensity of the different magnitudes to be determined depends.

As above said, in the present context by "footprint area" it is intended the portion of outer surface of the tyre in contact with the ground at a given time instant.

More specifically, the footprint area is herein defined between a first longitudinal end corresponding to the point at which the tyre comes into contact with the ground, and a second longitudinal end corresponding to the point at which the tyre separates from the ground.

In the above defined context the Applicant in particular has felt the necessity to be able to determine the interactions between tyre and ground, and specifically those generated along the longitudinal direction, in a simple manner and therefore according to algorithms that do not involve an excessive calculation complexity.

SUMMARY OF THE INVENTION

The Applicant therefore has become aware of the fact that it is possible to determine said interactions between tyre and ground in a simple and reliable manner by defining one or more indices showing a correlation with the forces that must be evaluated. The determination of these indices starts from detection of the radial deformations suffered by the tyre, in particular in the neighbourhood of the ends of the footprint area, and/or from determining magnitudes connected thereto, such as the rate of radial deformation and acceleration of radial deformation, for example.

In more detail, the Applicant has observed that in the profiles representative of the tyre deformation, it is possible to identify some characteristic points the coordinates of which can be combined with each other so as to supply useful information on the interactions between tyre and ground.

The Applicant has ultimately found that by correlating the data obtained from the deformation profiles with a parameter that is a function of the angular velocity of the tyre, it is possible to define indices showing a correlation with the magnitudes that must be determined.

More specifically, a set of indices is determined starting from a first parameter representative of a radial deformation of the tyre; in particular, a first and a second values of this parameter are determined, through evaluation of the latter in a predetermined neighbourhood of the first longitudinal end of the footprint area and in a predetermined neighbourhood of the second longitudinal end of the footprint area, respectively.

Then a linear combination of these two values is carried out, thereby obtaining a second parameter; afterwards a ratio between the second parameter and a third parameter representative of the angular velocity of the tyre is calculated.

Finally, by exploiting a suitable algorithm, a main parameter is calculated which is representative of at least one interaction along a longitudinal direction between the tyre and ground, in the footprint area.

In particular, in a first aspect the present invention relates to a method of determining at least one parameter representative of at least one interaction along a longitudinal direction between a tyre and ground, in which a footprint area is defined between a first and a second longitudinal ends, said method comprising the following steps:

- identifying a first parameter representative of a radial deformation of said tyre;
- determining a first and a second values of said first parameter, in a neighbourhood of the first longitudinal end of the footprint area and in a neighbourhood of the second longitudinal end of the footprint area, respectively;
- calculating a linear combination of said at least two values, thereby obtaining a second parameter;
- determining a third parameter representative of an angular velocity of said tyre;
- calculating a ratio between said second and third parameters;
- calculating a main parameter starting from said ratio, according to an algorithm, which main parameter is representative of at least one interaction along a longitudinal direction between said tyre and the ground.

In accordance with a second aspect, the invention relates to an apparatus for determining at least one parameter which is representative of at least one interaction along a longitudinal direction between a tyre and the ground, wherein a footprint area is defined between a first and a second longitudinal ends, said apparatus comprising:

- a sensor to detect a detection magnitude that is representative of a radial deformation of said tyre and to generate a corresponding main signal;
- a processing unit operatively associated with said sensor and provided with:
- a reception module to receive said main signal and determine a first parameter representative of a radial deformation of said tyre;
- a selection module to identify at least one first and one second values of said first parameter, said first and second values being determined in a neighbourhood of the first longitudinal end of the footprint area and in a neighbourhood of the second longitudinal end of the footprint area, respectively;
- a first calculation module operatively associated with said sensor to determine a second parameter which is obtained by carrying out a linear combination of said at least two values;
- a second calculation module to determine a third parameter which is representative of at least an angular velocity of said tyre;
- a third calculation module to carry out a ratio between said second and third parameters;
- a fourth calculation module to calculate a main parameter starting from said ratio, according to a predetermined algorithm, which main parameter is representative of at least one interaction along a longitudinal direction between said tyre and the ground, in the footprint area.

Further features and advantages will become more apparent from the detailed description of a preferred but not exclusive embodiment of a method and an apparatus for determining at least one parameter representative of at least one interaction along a longitudinal direction between a tyre and the ground.

BRIEF DESCRIPTION OF THE DRAWINGS

This description will be set out hereinafter with reference to the accompanying drawings, given by way of non-limiting example, in which:

FIG. 6 shows a graph of a curve representative of the rate of radial deformation of the tyre against time;

FIG. 7 shows a graph representative of the rate of radial deformation of the tyre, wherein regions are highlighted in which calculation of the area is approximated;

FIGS. 8 and 9 show graphs representative of the correlation between a second index determined by the method of the invention and respective longitudinal interactions between the tyre and ground;

FIGS. 10 and 11 show graphs representative of the correlation between a third index determined by the method of the invention and respective longitudinal interactions between the tyre and ground;

DETAILED DESCRIPTION OF THE INVENTION

With reference to the drawings, a tyre used for carrying out the method in accordance with the invention has been generally denoted at 1.

Figure 1A:
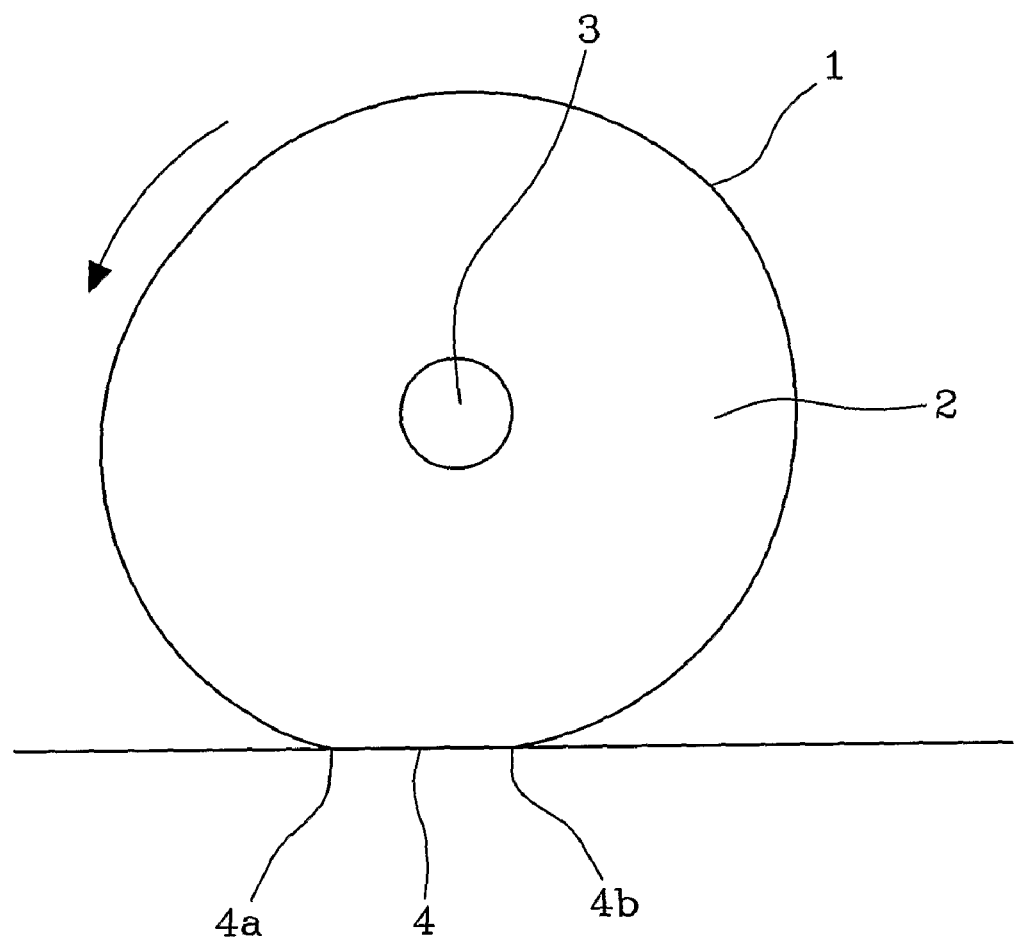
FIG. 1a is a diagrammatic side view of a tyre utilised for putting the method of the invention into practice.

Tyre 1 (FIG. 1a) is mounted on a rim 2, in turn mounted on a hub 3; through the hub 3 tyre 1 is associated with a vehicle (not shown) to allow running thereof. During the vehicle running, tyre 1 rolls on the ground and is submitted to a displacement in a longitudinal direction substantially parallel to the ground itself.

As above said, tyre 1 is in contact with the ground in the so-called "footprint area" 4, which area is defined between a first and a second longitudinal ends 4a, 4b.

The method of the invention first of all comprises a step of identifying a first parameter P11, P12, P13 representative of a radial deformation of tyre 1.

As it will be best understood in the following, this first parameter P11, P12, P13 can be the true radial deformation, the rate of radial deformation, or the acceleration of radial deformation; depending on the selected type of parameter, a different technique will be adopted to determine the interactions in the longitudinal direction between tyre 1 and the ground.

It is also to be pointed out that, while the rate of deformation and acceleration of deformation do not directly provide the information relating to the amount of radial deformation of the tyre, said rate and acceleration are in any case important parameters in evaluating the deformation and the features of said deformation, and can therefore be considered as parameters representative of the radial deformation of the tyre.

Figure 1B:
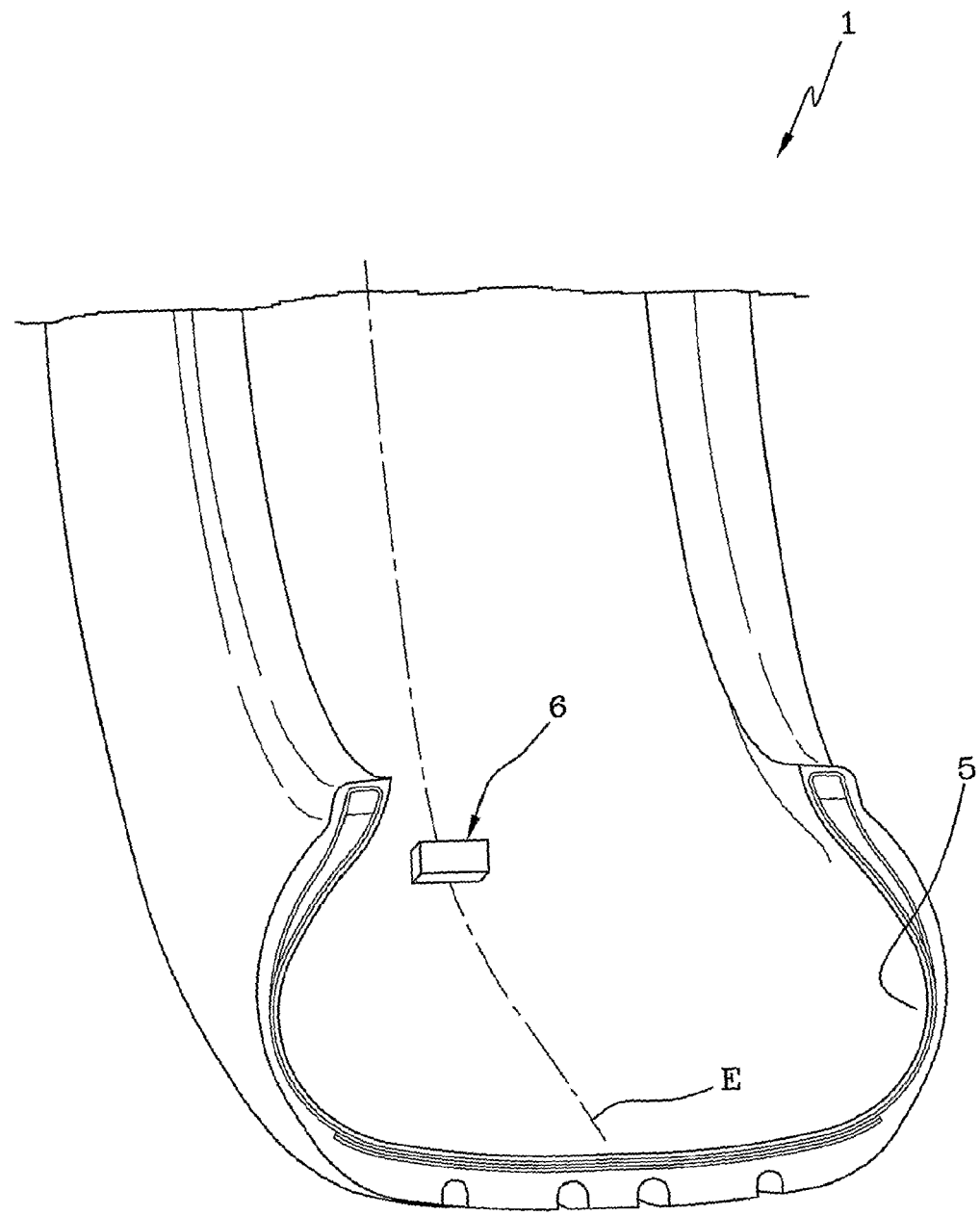
FIG. 1b is a diagrammatic perspective view of the tyre seen in FIG. 1a, with certain parts removed to render others more prominent.

Preferably, the method of the invention further comprises a step of detecting through a sensor 6 positioned on the radially internal surface 5 of tyre 1 (FIG. 1*b*), a detection magnitude representative of a radial deformation of tyre 1, and a step of generating a main signal 100 incorporating said detection magnitude.

Sensor 6 is preferably positioned in an equatorial plane E of tyre 1. The first parameter P11, P12, P13 is then determined depending on this main signal 100 and the detection magnitude incorporated therein.

Sensor 6 can be an accelerometer for example, that is suitably fastened to said radially internal surface 5 of tyre 1.

The detection magnitude can be the acceleration of radial deformation; starting from the latter, if necessary, it will be possible to calculate the rate of radial deformation (through an integration operation) and/or the radial deformation (through two integration operations).

Preferably, the main signal 100 is acquired to a frequency included between 1 kHz and 15 kHz (e.g. equal to 4 kHz) and is then multiplied by suitable factors in order to obtain a conversion from volts to m/s².

Once the wheel revolution has been identified and the angular velocity $\omega_0$ of tyre 1 has been determined, a Fast Fourier Transform (FFT) of the signal acquired on the individual wheel revolution is carried out.

Preferably, the main signal 100 is filtered, at least for eliminating the average value thereof and make the processing operations to be carried out afterwards lighter as regards their computational profile. In particular, the filtering operation can be of the band-pass type, carried out between a first pulsation $\omega_1$ and a second pulsation $\omega_2$.

The ratio between the first pulsation $\omega_1$ and the angular velocity $\omega_0$ of the tyre is preferably included between 0.5 and 5, and in particular included between 1 and 2.

The ratio between the second pulsation $\omega_2$ and the angular velocity $\omega_0$ of the tyre is preferably included between 10 and 30, and in particular included between 15 and 20.

Depending on the magnitude directly represented by the first parameter P11, P12, P13, a step of reconstruction of the first parameter itself can be provided, depending on the harmonics still present after filtering.

Then a first and a second values of the first parameter P11, P12, P13 are determined; the first value is determined in a neighbourhood of the first longitudinal end 4*a* of the footprint area 4, while the second value is determined in a neighbourhood of the second longitudinal end 4*b* of the footprint area 4.

Depending on the selected parameter (deformation, rate of deformation, acceleration of deformation), the point within said neighbourhoods is determined where the first parameter P11, P12, P13 is to be evaluated to obtain the first and second values.

The method of the invention further contemplates a step of calculating a linear combination of the first and second values, so as to obtain a second parameter P21, P22, P23; preferably the linear combination can consist of a sum or a difference, depending on the parameter that is wished to be calculated.

The method in addition comprises a step of determining a third parameter P31, P32, P33 representative of the angular velocity $\omega_0$ of tyre 1, and a step of calculating a ratio between the second and third parameters, thereby obtaining a respective index A, B, C.

The angular velocity $\omega_0$ of tyre 1 can be determined starting from the main signal 100 for example, or a trigger signal can be exploited which enables the time instant at which tyre 1 has completed a full revolution to be identified.

Finally, depending on the calculated ratio as above described, a main parameter PP representative of at least one interaction along the longitudinal direction between tyre 1 and the ground is calculated through a suitable algorithm.

This main parameter PP can be indicative of slippage of tyre 1 in a longitudinal direction and/or of the longitudinal force that is generated between tyre 1 and the ground.

Preferably, the algorithm is employed in combination with a series of prestored and suitably defined coefficients for execution of the requested calculation.

The general steps carried out in accordance with the method of the invention are substantially those stated above; these steps are now made explicit and detailed for each of the three indices for determining said longitudinal interactions.

In a first embodiment, the first parameter P11 is the radial deformation of tyre 1. This radial deformation can be calculated starting from the acceleration of radial deformation detected, for example, by means of an accelerometer (sensor 6) that is mounted on the radially internal surface 5 of tyre 1, and by carrying out two subsequent integration operations relative to time.

Preferably, the radial-deformation signal (i.e. the first parameter P11) is reconstructed by summing up the harmonics included in the considered frequency range in the filtering step, each multiplied by the respective weight.

The first value of the first parameter P11 is obtained through evaluation of the first parameter P11 itself at the first longitudinal end 4*a* of the footprint area 4 at a predetermined time instant.

The second value of the first parameter P11 is obtained through evaluation of the first parameter P11 itself at, the second longitudinal end 4*b* of the footprint area 4 at a different predetermined time instant. Preferably, for determining the first and second values of the first parameter P11, the following can be carried out.

Figure 2:
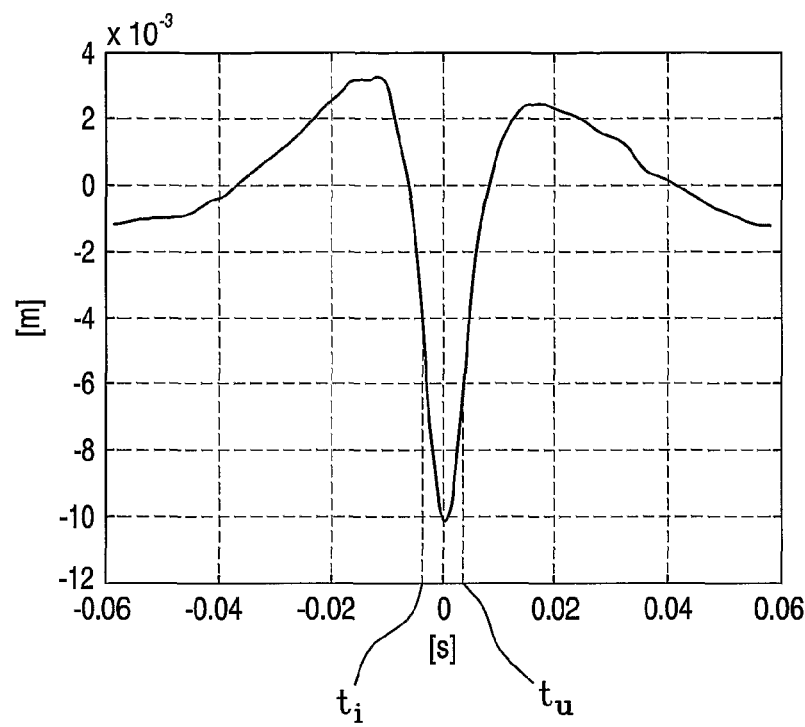
FIG. 2 shows a graph of a curve representative of the radial deformation of the tyre against time.

Through the main signal 100 detected by said sensor 6, a curve is defined (i.e. calculated) that represents the radial deformation to which tyre 1 has been submitted against time, within a time interval corresponding to a wheel revolution (FIG. 2).

Practically sensor 6, being integral with the radially internal surface 5 and following tyre 1 during rolling of the latter, supplies information relating to the radial deformation of tyre 1 for each angular position at which sensor 6 is.

When a revolution has been completed, sensor 6 has supplied all necessary data for definition of the curve having the time in the x-axis and a measurement of the radial deformation in the y-axis.

Figure 3:
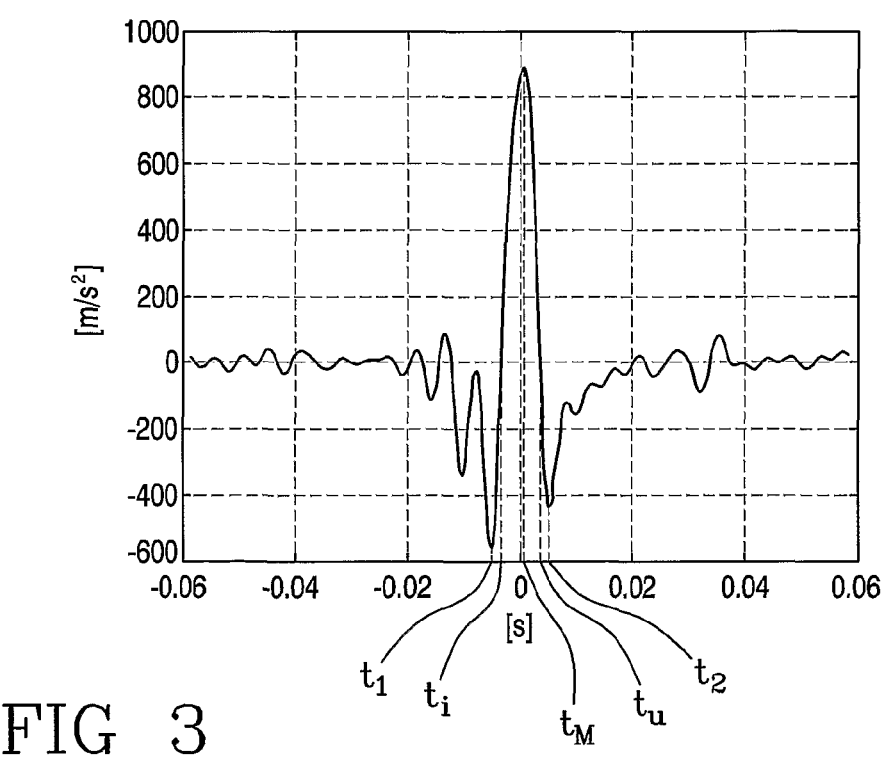
FIG. 3 shows a graph of a curve representative of the acceleration of radial deformation of the tyre against time.

To identify the "points" (i.e. the instants) at which the first parameter P11 is to be evaluated to obtain the first and second values, reference can be made to the curve describing the acceleration of radial deformation against time—still referred to the same interval corresponding to a full wheel revolution (FIG. 3).

It has been verified that the first and second ends 4*a*, 4*b* of the footprint area 4 correspond to the passages through zero immediately preceding and immediately following the absolute maximum, of the curve representative of the acceleration of radial deformation against time.

It is to be noted that the reference to points of maximum and points of minimum, as regards the considered deformation parameters, depends on the orientation according to which sensor 6 is mounted to the radially internal surface 5 of tyre 1.

If this mounting orientation is reversed, symmetric patterns (i.e. symmetric relative to the x-axis) against time and respective mirror-like graphs are obtained with respect to those shown in the accompanying drawings, to represent the deformation features of tyre 1.

Therefore, the method of the invention can be carried out also if mounting of sensor 6 takes place according to an orientation opposite to the one considered until now, and taking into account points of minimum instead of points of maximum and, vice versa, points of maximum instead of points of minimum.

The above explanations are valid for all the magnitudes taken into consideration for determining the main parameter PP, both in the first embodiment and in the second and third embodiments to be described in detail in the following.

After the zero-crossing instants $t_i$, $t_u$ have been determined, said instants practically being those at which sensor 6 is at the entry and at the exit of the footprint area 4, the curve representative of the radial deformation exactly at those instants $t_i$, $t_u$ is evaluated.

In the graph in FIG. 2 which is representative of the radial deformation, these instants correspond to the points of inflection.

The fact of determining the ends 4a, 4b of the footprint area 4 by exploiting the curve of the acceleration of radial deformation allows more accuracy as compared with the use of the curve representative of the radial deformation, since the zero-crossing points (i.e. the intersection points with the x-axis) are more easily identifiable than the points of inflection.

The value of the deformation function in each of the two instants $t_i$, $t_u$ thus gives the first and second values of the first parameter P11.

Alternatively, for determining the instants $t_i$, $t_u$, the instants of absolute minimum and absolute maximum respectively of the graph representative of the rate of radial deformation against time can be taken into account (in this case carrying out a single integration operation relative to time, starting from the acceleration of radial deformation), so as to avoid possible inaccuracies due to an excessive number of passages through zero in the acceleration graph, caused by particularly intense high-frequency harmonics.

As a further alternative, using a tangential accelerometer, the first end (i.e. the entry point) of the footprint area is identified by the absolute minimum, on the wheel revolution, of the tangential acceleration, while the second end (i.e. the exit point) of the footprint area is identified by the absolute maximum, on the wheel revolution, of the tangential acceleration.

The linear combination (second parameter P21) between the first and second values is preferably a subtraction, and is therefore indicative of the difference between the radial deformation occurring at the entry of the footprint area 4 and the radial deformation occurring at the exit of the footprint area 4.

The third parameter P31, representative of the angular velocity $\omega_0$ of tyre 1 is preferably the longitudinal length of the footprint area 4.

The length of the footprint area 4 can be calculated by multiplying the angular velocity $\omega_0$ of the tyre by the average radius R of the tyre itself, and by a time factor $\Delta t$, representative of the time duration of the interval spent by sensor 6 within the footprint area 4.

Practically, the time factor $\Delta t$ can be calculated as the time distance between the two instants $t_i$, $t_u$ identified above, as corresponding to the longitudinal ends 4a, 4b of the footprint area 4.

More generally, said factor or parameter $\Delta t$ which is representative of a time duration, represents the necessary time for a point integral with the radially internal surface 5 of tyre 1 to move from the first to the second longitudinal end 4a, 4b of the footprint area 4 during rolling of the tyre 1 itself.

Therefore the third parameter P31 can be calculated as $$P31 = \omega_0 \cdot R \cdot \Delta t$$

By finally carrying out the ratio between the result of the linear combination P21 and the longitudinal length of the footprint area P31, the first index A is obtained:

$$A = \frac{P21}{P31}$$

Figure 4:
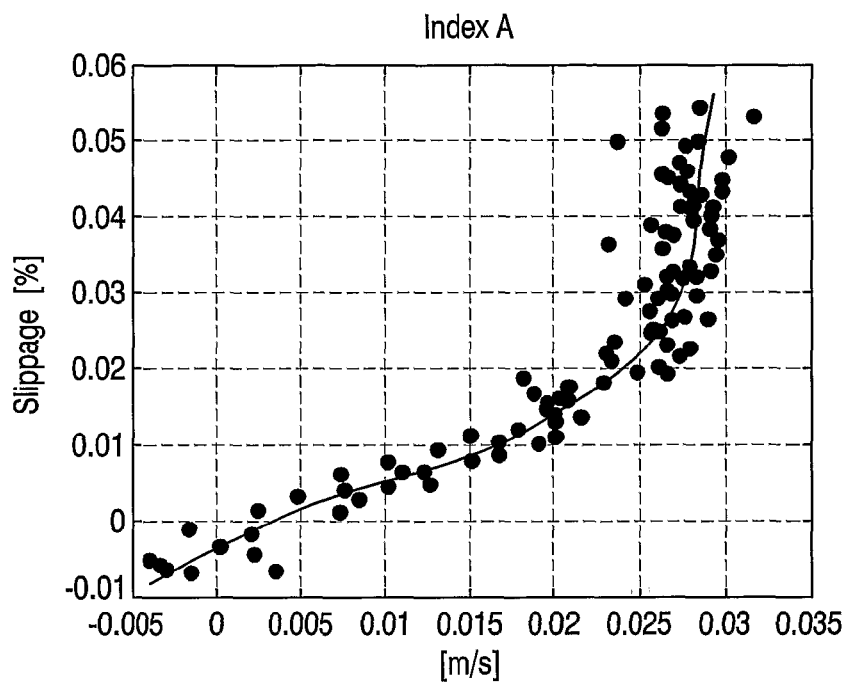
FIGS. 4 and 5 are graphs representative of the correlation between a first index determined by the method of the invention and respective longitudinal interactions between the tyre and ground.
Figure 5:
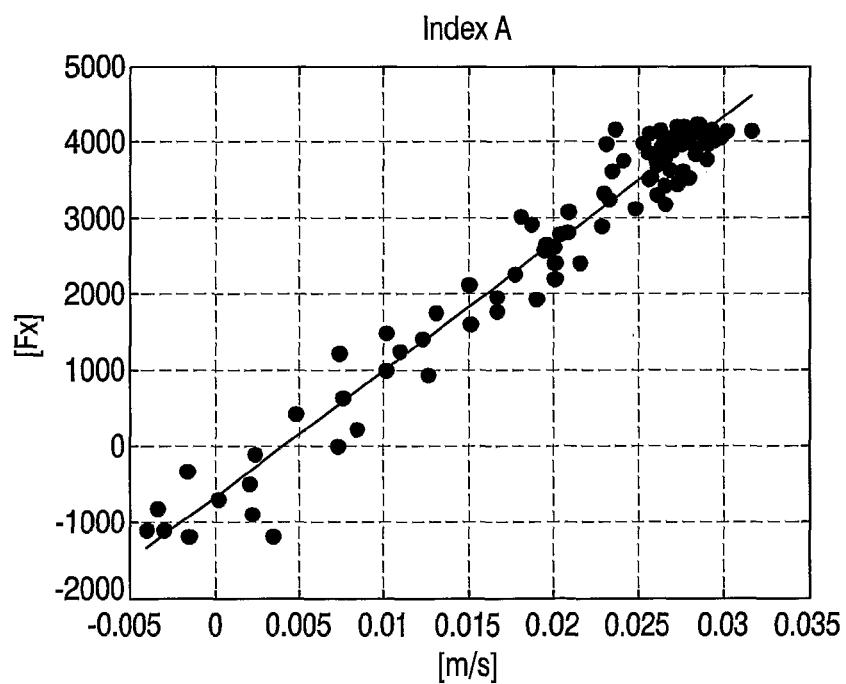

FIG. 4 shows the correlation between A and the longitudinal slippage of the tyre in the case of a tyre P6 size 195/65 R16, while FIG. 5, still for the same tyre, shows the correlation between A and the longitudinal force generated between the tyre and the ground in the footprint area.

It is to be noted that the relation between A and the longitudinal force is substantially linear, there is no dependence on the vertical load, and dispersion is very reduced.

In a second embodiment, the first parameter P12 is the rate of radial deformation. This rate of radial deformation can be calculated starting from detection of the radial acceleration for example, and executing an integration operation relative to time.

Preferably the signal of radial-deformation rate (i.e. the first parameter P12) is reconstructed by summing up the harmonics included in the considered range of frequencies in the filtering step, each multiplied by the respective weight.

The first value of the first parameter P12 is obtained through evaluation of the first parameter P12 at the first longitudinal end 4a of the footprint area 4 at a predetermined time instant.

The second value of the first parameter P12 is obtained through evaluation of the first parameter P12 at the second longitudinal end 4b of the footprint area 4 at a different predetermined time interval.

Preferably, for determining the first and second values of the first parameter P12, the following can be carried out.

The time instants $t_i$, $t_u$ corresponding to the first and second longitudinal ends 4a, 4b of the footprint area 4 are identified, in quite the same manner as in the preceding execution step of the method of the invention: i.e. these instants can be identified as zero-crossings of the curve of acceleration of radial deformation, or as the points of absolute maximum and absolute minimum in a wheel revolution of the acceleration of tangential deformation.

Once the curve representative of the rate of radial deformation against time (FIG. 6) has been defined, in a time interval corresponding to a wheel revolution, the value of this function at the time instants $t_i$, $t_u$ identified as above described is calculated.

Thus, the first and second values of the first parameter P12 are obtained.

In the second embodiment, calculation of the linear combination between the first and second values, i.e. calculation of the second parameter P22 is carried out by executing a sum between said first and second values.

The third parameter P32 representative of the angular velocity $\omega_0$ of tyre 1 is preferably calculated by multiplying the angular velocity $\omega_0$ of tyre 1 by the value of the average radius R of the tyre 1 itself.

Preferably, the step of calculating the third parameter P32 further comprises a step of multiplying the angular velocity $\omega_0$ and the average radius R by a factor included between −1.5 and −5, and in particular equal to −2.

Through calculation of the ratio between the second and third parameters P22, P32, the second index B is therefore obtained:

$$B = \frac{P22}{P32}$$

Index B practically is an approximation of index A, obtained through the property of the differential calculus, according to which:

$$\Delta s_r = s_{r,i} - s_{r,u} = -(s_{r,u} - s_{r,i}) = -\int_{s_{r,i}}^{s_{r,u}} v_r(t)dt$$

wherein $\Delta s_r$ represents the difference between the values ($s_{r,i}$, $s_{r,u}$) of the radial deformation evaluated at the entry and exit of the footprint area and $v_r(t)$ represents the rate of radial deformation against time.

If the curve representative of the rate of radial deformation is linearly approximated, calculation of the subtended area (FIG. 7) representative of the above stated integral can therefore be carried out according to the following formula:

$$a = \frac{1}{2}(v_{r,u} + v_{r,i}) \cdot (t_u - t_i)$$

from which the algorithm for calculation of index B comes.

It is to be pointed out that the relation between B and the longitudinal force is substantially linear, there is no substantial dependence on the vertical load and dispersion is very reduced.

FIG. 8 shows the correlation between B and the longitudinal slippage of the tyre (with different vertical loads corresponding to 2000, 3500 and 5000 N) in the case of a tyre P6 size 195/65 R16, while FIG. 9 still for the same tyre shows the correlation between B and the longitudinal force generated between the tyre and the ground in the footprint area.

In a third embodiment, the first parameter P13 is the acceleration of radial deformation.

The steps for determining this first parameter P13 are substantially the same as described above for the first and second embodiments; the only difference is that in this third case after the FFT and filtering, reconstruction of the signal is not required.

The first parameter P13 is then measured at a first and a second time instants $t_1$, $t_2$, to obtain said first and second values (FIG. 3).

The first time instant $t_1$ is the instant at which, in the curve representative of the acceleration of radial deformation against time, the acceleration of radial deformation has the absolute minimum within a wheel revolution.

The second time instant $t_2$ is the instant at which, in the curve representative of the acceleration of radial deformation against time, the acceleration of radial deformation has another minimum; this second instant $t_2$ is subsequent in time to instant $t_N$ at which, within a wheel revolution, an absolute maximum occurs, and there are no relative minima of the acceleration of radial deformation between the instant of absolute maximum $t_M$ and the second instant $t_2$. In other words, the minimum of the acceleration of radial deformation identified by the second instant $t_2$ is the minimum subsequent in time and closest in time to the absolute maximum.

As above said, the maximum and minimum evaluation can be reversed depending on the orientation of sensor 6 on the radially internal surface 5 of tyre 1.

Therefore, if the mounting orientation of sensor 6 is reversed, the first time instant $t_1$ is the instant at which, in the curve representative of the acceleration of radial deformation against time, the acceleration of radial deformation has the absolute maximum within a wheel revolution; the second time instant $t_2$ on the contrary is the maximum subsequent in time and closest in time to the absolute minimum of the curve of acceleration of radial deformation against time.

The second parameter P23, calculated through a linear combination between the first and second values, is preferably calculated through a difference between said first and second values.

The third parameter P33 representative of the angular velocity $\omega_0$ of tyre 1, is preferably the longitudinal length of the footprint area 4, and can be calculated by multiplying the angular velocity $\omega_0$ by the average radius R of tyre 1 and by a time factor $\Delta t$ representative of the time spent by sensor 6 within the footprint area 4.

Practically, the time factor $\Delta t$ can be calculated as the time distance between the two instants $t_i$, $t_u$ identified as corresponding to the longitudinal ends 4a, 4b of the footprint area 4; these instants $t_i$, $t_u$ can be calculated as the instants at which the curve representative of the acceleration of radial deformation against time has zero-crossings that are the closest in time to the instant of absolute maximum.

More generally, said factor or parameter $\Delta t$ representative of a time duration represents the necessary time for a point integral with the radially internal surface 5 of tyre 1 to move from the first to the second longitudinal end 4a, 4b of the footprint area 4 during rolling of the tyre 1 itself.

Through calculation of the ratio between the second and third parameters P23, P33, then the third index C is obtained:

$$C = \frac{P23}{P33}$$

It is to be noted that index C has a substantially linear relation with the longitudinal force, depends on the vertical load applied to the tyre and has an acceptable dispersion.

An advantageous aspect resulting from use of index C appears in the absence of integration operations to be carried out for calculation of the parameter, which can result in a greater calculation velocity and/or in less pressing hardware/software requirements to implement the computational algorithm.

FIG. 10, for the tyre P6 size 195/65 R16 shows the correlation between C and the longitudinal tyre slippage, while FIG. 11 still for the same tyre, shows the correlation between C and the longitudinal force generated between tyre and ground in the footprint area.

Figure 12:
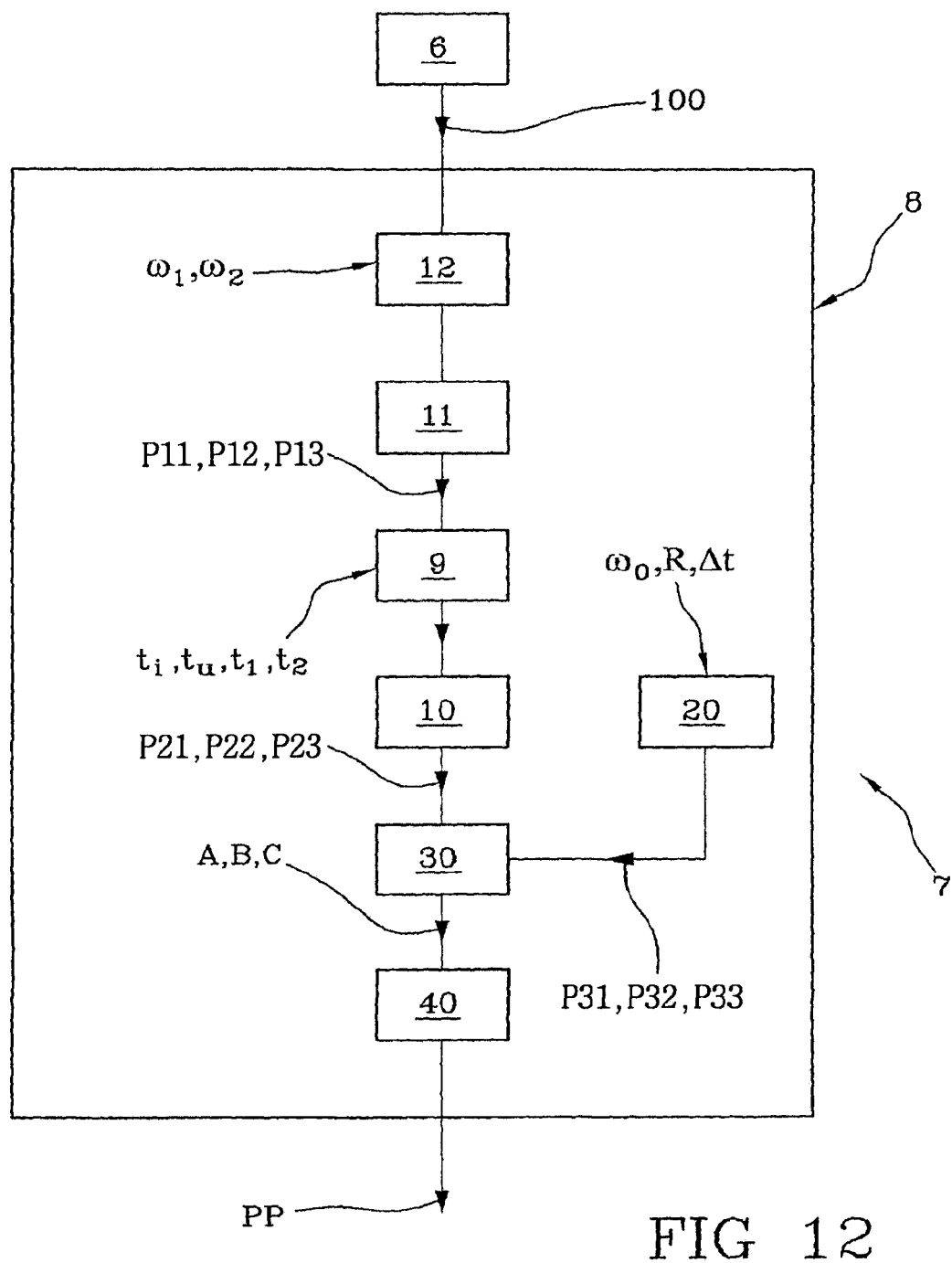
FIG. 12 shows a block diagram of an apparatus provided for putting the method of the invention into practice.

Shown in FIG. 12 is a bloc diagram of an apparatus 7 provided for calculation of the main parameter PP representative of the interaction between the tyre 1 and ground along the longitudinal direction.

Apparatus 7 first of all comprises said sensor 6 to detect the detection magnitude representative of the radial deformation of the tyre and to generate the corresponding main signal 100.

Apparatus 7 further comprises a processing unit 8 operatively associated with said sensor 6 to carry out the necessary processing operations for obtaining the main parameter PP.

Preferably the processing unit 8 is mounted on board the vehicle to which tyre 1 is engaged.

Practically, the processing unit 8 can be integrated, in terms of hardware and/or software, into the instruments on board the vehicle, so as to enable communication with other measurement and control devices in order to supply both the driver and the different automatic control modules with all necessary information for safe travelling.

The processing unit 8 comprises a reception module 11 to receive the main signal 100 and determine the first parameter P11, P12, P13, representative of a radial deformation of said tyre 1, as a function of the detection magnitude.

Preferably, the processing unit 8 comprises a filtering module 12 to filter the main signal 100 according to the above described modes (band-pass filtering carried out between the pulsations $\omega_1$ and $\omega_2$, with $\omega_1/\omega_0$ preferably included between 0.5 and 5, in particular included between 1 and 2 and $\omega_2/\omega_0$ preferably included between 10 and 30, in particular between 15 and 20).

The processing unit 8 further comprises a selection module 9 to determine the first and second values of the first parameter P11, P12, P13 in respective neighbourhoods of the first and second longitudinal ends 4a, 4b of the footprint area 4.

In addition, the processing unit 8 comprises a first calculation module 10, operatively associated with sensor 6, to calculate the second parameter P21, P22, P23 obtained through a linear combination of the first and second values.

The processing unit 8 also comprises a second calculation module 20 to determine the third parameter P31, P32, P33 that, as above described, is representative of the angular velocity $\omega_0$ of tyre 1.

In order to calculate the ratio between the second and third parameters, the processing unit 8 is provided with a third calculation module 30.

Starting from the ratio defining the first, second or third index A, B, C, a fourth calculation module 40 carries out calculation of the desired main parameter PP, using a suitably provided algorithm. Preferably the algorithm is used in combination with one or more prestored coefficients.

In more detail, in the first embodiment the first parameter P11 used for calculation of the main parameter PP is the radial deformation of tyre 1.

The selection module 9 determines the first and second values of the first parameter P11 and evaluates the latter in the first and second longitudinal ends 4a, 4b of the footprint area 4 at respective time instants $t_i$, $t_u$.

The first calculation module 10 carries out a difference between the first and second values for calculating the second parameter P21.

The second calculation module 20 determines the third parameter P31 through measurement or calculation of the longitudinal length of the footprint area 4 (as above described).

By carrying out the ratio between P21 and P31, the third calculation module 30 calculates the first index A, so that the fourth calculation module 40 can calculate the main parameter PP depending on said first index A.

In the second embodiment, the first parameter P12 used for calculation of the main parameter PP is the rate of radial deformation of the tyre.

The selection module 9 determines the first and second values of the first parameter P12 through an evaluation of the latter in the first and second longitudinal ends 4a, 4b of the footprint area 4 at respective time instants $t_i$, $t_u$.

The first calculation module 10 carries out a sum between the first and second values for calculating the second parameter P22.

The second calculation module 20 determines the third parameter P32 through measurement or calculation of the angular velocity $\omega_0$ of tyre 1 and by multiplying the latter by the average radius R and by a factor included between −1.5 and −5, and in particular equal to −2.

By carrying out the ratio between P22 and P32, the third calculation module 30 calculates the second index B, so that the fourth calculation module 40 can calculate the main parameter PP depending on said second index B.

In the third embodiment, the first parameter P13 used for calculation of the main parameter PP is the acceleration of radial deformation of tyre 1.

The selection module 9 determines the first and second values of the first parameter P13, the latter being evaluated at the above mentioned points $t_1$, $t_2$ (points of minimum of the curve of acceleration of radial deformation against time).

The first calculation module 10 carries out a difference between the first and second values for calculating the second parameter P23.

The second calculation module 20 determines the third parameter P33 through measurement and calculation of the longitudinal length of the footprint area, preferably by multiplying the angular velocity $\omega_0$ of tyre 1, the average radius R and the time factor $\Delta t$ by each other.

By carrying out the ratio between P23 and P33, the third calculation module 30 calculates the third index C, so that the fourth calculation module 40 can calculate the main parameter PP depending on said third index C.

It will be recognised that the division into modules set out above has been used for the purpose alone of clarifying the different operating functions of apparatus 7 and of the relevant processing unit 8; therefore the division into modules does not necessarily reflect a hardware division of the processing unit into circuit blocks distinct from each other, and therefore the functional structure of apparatus 7 can be, for example, obtained even with a single processor suitably set for implementation of the above described functions.

The invention claimed is:

1. A method of determining at least one main parameter representative of at least one interaction along a longitudinal direction between a tyre and ground, wherein a footprint area is defined between a first and a second longitudinal ends, comprising the following steps:
    identifying a first parameter representative of a radial deformation of said tyre;
    determining a first and a second values of said first parameter in a neighbourhood of the first longitudinal end of the footprint area and in a neighbourhood of the second longitudinal end of the footprint area, respectively, wherein the first value is associated with a first time instant and the second value is associated with a second time instant;
    calculating a linear combination of said first and second values, thereby obtaining a second parameter;
    determining a third parameter representative of an angular velocity of said tyre;
    calculating a ratio between said second and third parameters; and
    calculating said main parameter starting from said ratio, according to an algorithm, which main parameter is representative of at least one interaction along a longitudinal direction between said tyre and the ground.

2. The method as claimed in claim 1, wherein said first parameter is a radial deformation of said tyre.

3. The method as claimed in claim 2, wherein said first value is obtained through evaluation of said first parameter in the first longitudinal end of said footprint area at the first time instant.

4. The method as claimed in claim 2, wherein said second value is obtained through evaluation of said first parameter in the second longitudinal end of said footprint area at the second time instant.

5. The method as claimed in claim 2, wherein said step of calculating a linear combination between said first and second values determines a difference between said first and second values.

6. The method as claimed in claim 2, wherein said third parameter is representative of a longitudinal length of said footprint area.

7. The method as claimed in claim 1, wherein said first parameter is a rate of radial deformation of said tyre.

8. The method as claimed in claim 7, wherein said first value is obtained through evaluation of said first parameter in the first longitudinal end of said footprint area at the first time instant.

9. The method as claimed in claim 7, wherein said second value is obtained through evaluation of said first parameter in the second longitudinal end of said footprint area at the second time instant.

10. The method as claimed in claim 9, wherein a step of determining said second parameter comprises a sub-step of multiplying said first and second values by a parameter representative of a time duration, the time duration defining the necessary time for a point integral with a radially internal surface of said tyre to move from the first to the second longitudinal end of said footprint area during rolling of said tyre.

11. The method as claimed in claim 7, wherein said step of calculating a linear combination between said first and second values determines a sum between said first and second values.

12. The method as claimed in claim 7, wherein said third parameter is representative of the longitudinal length of said footprint area.

13. The method as claimed in claim 1, wherein said first parameter is an acceleration of radial deformation of said tyre.

14. The method as claimed in claim 13, wherein said first value is obtained through measurement of said first parameter at the first time instant in a curve representative of acceleration of deformation against time, said first time instant being an instant at which an absolute minimum of the acceleration of radial deformation occurs.

15. The method as claimed in claim 13, wherein said second value is obtained through evaluation of said first parameter at the second time instant in a curve representative of said acceleration of deformation against time, said second time instant being the instant at which a minimum of the acceleration of radial deformation occurs, said second instant being subsequent in time to an instant at which an absolute maximum, in a wheel revolution, of said acceleration of radial deformation occurs, said minimum being a closest minimum in time to said absolute maximum among a minima subsequent in time to said absolute maximum.

16. The method as claimed in claim 13, wherein said first value is obtained through measurement of said first parameter at the first time instant in a curve representative of acceleration of deformation against time, said first time instant being the instant at which an absolute maximum of acceleration of radial deformation occurs.

17. The method as claimed in claim 13, wherein said second value is obtained through evaluation of said first parameter at the second time instant in a curve representative of acceleration of deformation against time, said second time instant being an instant at which a maximum of the acceleration of radial deformation occurs, said second instant being subsequent in time to an instant at which an absolute minimum, in a wheel revolution, of said acceleration of radial deformation occurs, said maximum being a closest maximum in time to an absolute minimum among a maxima subsequent in time to said absolute minimum.

18. The method as claimed in claim 13, wherein said step of calculating a linear combination between said first and second values determines a difference between said first and second values.

19. The method as claimed in claim 13, wherein said third parameter is a longitudinal length of said footprint area.

20. The method as claimed in claim 1, further comprising a step of detecting through a sensor positioned on a radially internal surface of said tyre, a detection magnitude representative of a radial deformation of said tyre, and a step of generating a main signal incorporating said detection magnitude, said first parameter being determined as a function of said main signal.

21. The method as claimed in claim 20, further comprising a step of filtering said main signal at least for eliminating an average value of said main signal.

22. The method as claimed in claim 21, wherein said filtering step comprises a band-pass filtering operation between a first pulsation and a second pulsation.

23. The method as claimed in claim 22, wherein a ratio between said first pulsation and the angular velocity of the tyre is 0.5 to 5.

24. The method as claimed in claim 22, wherein the ratio between said second pulsation and the angular velocity of the tyre is 10 to 30.

25. The method as claimed in claim 1, wherein the main parameter is representative of a measure of slippage.

26. The method as claimed in claim 1, wherein, the wherein the main parameter is representative of a longitudinal force generated between the tyre and the ground in the footprint area.

27. An apparatus for determining at least one main parameter which is representative of at least one interaction along a longitudinal direction between a tyre and ground, wherein a footprint area is defined between a first and a second longitudinal ends, comprising:
  a sensor to detect a detection magnitude that is representative of a radial deformation of said tyre and to generate a corresponding main signal;
  a processing unit operatively associated with said sensor and provided with:
    a reception module to receive said main signal and to determine a first parameter representative of a radial deformation of said tyre;
    a selection module to identify at least one first and one second value of said first parameter, said first and second values being determined in a neighbourhood of the first longitudinal end of the footprint area and in a neighbourhood of the second longitudinal end of the footprint area, respectively, wherein the first value is associated with a first time instant and the second value is associated with a second time instant;
    a first calculation module operatively associated with said sensor to determine a second parameter which is obtained by carrying out a linear combination of said at least two values; and a second calculation module to determine a third parameter which is at least representative of an angular velocity of said tyre;

a third calculation module to carry out a ratio between said second and third parameters;

a fourth calculation module to calculate said main parameter starting from said ratio, according to a predetermined algorithm, said main parameter being representative of at least one interaction along a longitudinal direction between said tyre and the ground in the footprint area.

28. The apparatus as claimed in claim 27, wherein said first parameter is a radial deformation of said tyre.

29. The apparatus as claimed in claim 28, wherein said first value is obtained through evaluation of said first parameter in the first longitudinal end of said footprint area at the first time instant.

30. The apparatus as claimed in claim 29, wherein said second value is obtained through evaluation of said first parameter in the second longitudinal end of said footprint area at the second time instant.

31. The apparatus as claimed in claim 28, wherein said first calculation module determines said second parameter by carrying out a difference between said first and second values.

32. The apparatus as claimed in claim 28, wherein said third parameter is the longitudinal length of said footprint area.

33. The apparatus as claimed in claim 27, wherein said first parameter is a rate of radial deformation of said tyre.

34. The apparatus as claimed in claim 33, wherein said first value is obtained through evaluation of said first parameter in the first longitudinal end of said footprint area at the first time instant.

35. The apparatus as claimed in claim 34, wherein said second value is obtained through evaluation of said first parameter in the second longitudinal end of said footprint area at the second time instant.

36. The apparatus as claimed in claim 33, wherein said first calculation module determines said second parameter by carrying out a sum between said first and second values.

37. The apparatus as claimed in claim 36, further comprising a step of multiplying said first and second values by a parameter representative of a time duration, the time duration defining a necessary time for a point integral with a radially internal surface of said tyre to move from the first to the second longitudinal end of said footprint area during rolling of said tyre.

38. The apparatus as claimed in claim 33, wherein said third parameter is the longitudinal length of said footprint area.

39. The apparatus as claimed in claim 27, wherein said first parameter is an acceleration of radial deformation of said tyre.

40. The apparatus as claimed in claim 39, wherein said first value is obtained through measurement of said first parameter at the first time instant in a curve representative of acceleration of deformation against time, said first time instant being an instant at which an absolute minimum of acceleration of radial deformation occurs.

41. The apparatus as claimed in claim 39, wherein said second value is obtained through an evaluation of said first parameter at the second time instant in a curve representative of said acceleration of deformation against time, said second time instant being the instant at which a minimum of the acceleration of radial deformation occurs, said second instant being subsequent in time to an instant at which an absolute maximum, in a wheel revolution, of acceleration of radial deformation occurs, said minimum being a closest minimum in time to said absolute maximum among a minima subsequent in time to said absolute maximum.

42. The apparatus as claimed in claim 39, wherein said first value is obtained through measurement of said first parameter at the first time instant in a curve representative of said acceleration of deformation against time, said first time instant being an instant at which an absolute maximum of the acceleration of radial deformation occurs.

43. The apparatus as claimed in claim 39, wherein said second value is obtained through evaluation of said first parameter at the second time instant in a curve representative of said acceleration of deformation against time, said second time instant being an instant at which a maximum of the acceleration of radial deformation occurs, said second instant being subsequent in time to an instant at which an absolute minimum, in a wheel revolution, of acceleration of radial deformation occurs, said maximum being a closest maximum in time to an absolute minimum among a maxima subsequent in time to said absolute minimum.

44. The apparatus as claimed in claim 39, wherein said first calculation module determines said second parameter by carrying out a difference between said first and second values.

45. The apparatus as claimed in claim 39, wherein said third parameter is the longitudinal length of said footprint area.

46. The apparatus as claimed in claim 27, wherein said processing unit further comprises a filtering module operatively associated with said sensor to filter said main signal and eliminate at least an average value of said main signal.

47. The apparatus as claimed in claim 46, wherein said filtering module comprises a band-pass filter active between a first pulsation and a second pulsation.

48. The apparatus as claimed in claim 47, wherein the ratio between said first pulsation and the angular velocity of the tyre is 0.5 to 5.

49. The apparatus as claimed in claim 47, wherein a ratio between said second pulsation and the angular velocity of the tyre is 10 to 30.

50. The apparatus as claimed in claim 27, wherein said processing unit is mounted on board a vehicle to which said tyre is engaged.

51. The apparatus as claimed in claim 27, wherein the main parameter is representative of a measure of slippage.

52. The apparatus as claimed in claim 27, wherein, the wherein the main parameter is representative of a longitudinal force generated between the tyre and the ground in the footprint area.

* * * * *

UNITED STATES PATENT AND TRADEMARK OFFICE
CERTIFICATE OF CORRECTION

PATENT NO. : 8,296,080 B2
APPLICATION NO. : 12/312853
DATED : October 23, 2012
INVENTOR(S) : Mancosu et al.

Page 1 of 1

It is certified that error appears in the above-identified patent and that said Letters Patent is hereby corrected as shown below:

In the Claims

Claim 26, col. 14, line 39, "wherein, the wherein" should read --wherein--.

Claim 52, col. 16, lines 54 and 55, "wherein, the wherein" should read --wherein--.

Signed and Sealed this
Sixteenth Day of July, 2013

Teresa Stanek Rea
*Acting Director of the United States Patent and Trademark Office*